(12) United States Patent
Xu et al.

(10) Patent No.: US 9,115,721 B2
(45) Date of Patent: Aug. 25, 2015

(54) TURBOFAN AND GRAPHICS CARD WITH THE TURBOFAN

(71) Applicant: NVIDIA Corporation, Santa Clara, CA (US)

(72) Inventors: Pengwei Xu, Shenzhen (CN); Yuan Yuan, Shanghai (CN); Songliang Ni, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 239 days.

(21) Appl. No.: 13/748,545

(22) Filed: Jan. 23, 2013

(65) Prior Publication Data

US 2014/0133082 A1    May 15, 2014

(30) Foreign Application Priority Data

Nov. 9, 2012  (CN) .......................... 2012 1 0447558

(51) Int. Cl.
*H05K 7/20* (2006.01)
*F04D 17/16* (2006.01)
*G06F 1/20* (2006.01)
*F04D 17/02* (2006.01)

(52) U.S. Cl.
CPC .............. *F04D 17/16* (2013.01); *F04D 17/025* (2013.01); *G06F 1/20* (2013.01)

(58) Field of Classification Search
USPC ........................ 361/676–678, 679.46–679.54, 361/688–722, 831
See application file for complete search history.

(56) References Cited

U.S. PATENT DOCUMENTS

| 6,457,955 | B1* | 10/2002 | Cheng ........................ 417/423.8 |
| 6,537,019 | B1* | 3/2003 | Dent ............................... 415/61 |
| 7,184,268 | B2* | 2/2007 | Espinoza-Ibarra et al. ... 361/695 |
| 7,391,612 | B2* | 6/2008 | Foster et al. .................. 361/697 |
| 8,241,011 | B2* | 8/2012 | Huang .......................... 417/244 |
| 2002/0090307 | A1* | 7/2002 | Cheng ........................ 417/423.1 |
| 2006/0039110 | A1* | 2/2006 | Foster et al. .................. 361/697 |
| 2006/0213643 | A1* | 9/2006 | Hashimoto et al. .......... 165/80.3 |

* cited by examiner

*Primary Examiner* — Courtney Smith
(74) *Attorney, Agent, or Firm* — Zilka-Kotab, PC

(57) ABSTRACT

The present invention provides a turbofan and a graphics card with the turbofan. The turbofan comprises: a turbofan assembly which admits air in an axial direction and dispenses air in a radial direction; an inlet fan assembly disposed at an inlet of the turbofan assembly and disposed coaxially with the turbofan assembly; and a driving means for driving the turbofan assembly and the inlet fan assembly to rotate. The turbofan provided by the invention gathers the ambient air to the inlet through the inlet fan assembly disposed at the inlet of the turbofan assembly, so as to change a negative pressure state at the inlet. Consequently, the cooling efficiency of the turbofan is improved effectively and the noise of the turbofan is reduced.

10 Claims, 3 Drawing Sheets

TURBOFAN AND GRAPHICS CARD WITH THE TURBOFAN

CROSS-REFERENCE TO RELATED APPLICATIONS

This application claims priority to Chinese Patent Application No. 201210447558.5, filed on Nov. 9, 2012, which is hereby incorporated by reference in its entirety.

FIELD OF INVENTION

The present invention relates generally to the heat dissipation technology, in particular, to a turbofan and a graphics card with the turbofan.

BACKGROUND

At present, turbofans have come into use in most graphics cards with high power to cool the Graphics Processing Unit (GPU) of the graphics cards. The cooling performance of the turbofan mainly depends on the quantity of the airflow passing through the vanes of the turbofan. The more the airflow passes through the vanes of the turbofan, the better the cooling effect is. The rotating speed of the turbofan is usually enhanced to enable as much airflow as possible to pass through the vanes, but it certainly leads to a boring noise.

With the increase of the processing capacity and the operating rate of the GPU, the heat generated by the GPU becomes greater. Consequently, the designer has to balance between the noise and the high performance of the GPU. Because of the demand on the GPU with high performance by the user, the designer has to compromise with the high performance and choose a relatively higher rotating speed of the turbofan to ensure the temperature of the GPU within a tolerable scope.

Therefore, there is a need of providing a turbofan and a graphics card with the turbofan to solve the above problem in the prior art.

SUMMARY OF THE INVENTION

In order to solving the above problem, a turbofan is provided in the present invention, which comprises: a turbofan assembly which admits air in an axial direction and dispenses air in a radial direction; an inlet fan assembly disposed at an inlet of the turbofan assembly and disposed coaxially with the turbofan assembly; and a driving means for driving the turbofan assembly and the inlet fan assembly to rotate.

Preferably, the turbofan assembly comprises a first annular support and first vanes disposed on the first annular support, the first vanes extend along the axial direction of the turbofan, and the first annular support forms a space in the interior thereof.

Preferably, the driving means and the inlet fan assembly are disposed in the space.

Preferably, vanes of the inlet fan assembly extend along the radial direction of the turbofan.

Preferably, the inlet fan assembly is disposed in the space and located at one side of the first annular support in proximity to the inlet.

Preferably, a diameter of the inlet fan assembly matches with an inner diameter of the first annular support.

Preferably, the inlet fan assembly comprises a second annular support and second vanes disposed on the second annular support, the second annular support is disposed coaxially with the first annular support and at least a portion of the second annular support is contained in the space, and the second vanes extend along the axial direction of the turbofan.

Preferably, one side of the second annular support away from the inlet is connected to one side of the first annular support away from the inlet.

Preferably, an axial length of the second annular support is less than or equal to an axial length of the first annular support.

Preferably, a diameter of the inlet fan assembly is ¼ to ¾ of a diameter of the turbofan assembly.

According to another aspect of the invention, a graphics card with a turbofan thereon is provided, which comprises: a turbofan assembly which admits air in an axial direction and dispenses air in a radial direction; an inlet fan assembly disposed at an inlet of the turbofan assembly and disposed coaxially with the turbofan assembly: and a driving means for driving the turbofan assembly and the inlet fan assembly to rotate.

Preferably, the turbofan assembly comprises a first annular support and first vanes disposed on the first annular support, the first vanes extend along the axial direction of the turbofan, and the first annular support forms a space in the interior thereof.

Preferably, the driving means and the inlet fan assembly are disposed in the space.

Preferably, vanes of the inlet fan assembly extend along the radial direction of the turbofan.

Preferably, the inlet fan assembly is disposed in the space and located at one side of the first annular support in proximity to the inlet.

Preferably, a diameter of the inlet fan assembly matches with an inner diameter of the first annular support.

Preferably, the inlet fan assembly comprises a second annular support and second vanes disposed on the second annular support, the second annular support is disposed coaxially with the first annular support and at least a portion of the second annular support is contained in the space, and the second vanes extend along the axial direction of the turbofan.

Preferably, one side of the second annular support away from the inlet is connected to one side of the first annular support away from the inlet.

Preferably, an axial length of the second annular support is less than or equal to an axial length of the first annular support.

Preferably, a diameter of the inlet fan assembly is ¼ to ¾ of a diameter of the turbofan assembly.

The turbofan provided by the invention gathers the ambient air to the inlet through the inlet fan assembly disposed at the inlet of the turbofan assembly, so as to change a negative pressure state at the inlet. Consequently, the cooling efficiency of the turbofan is improved effectively and the noise of the turbofan is reduced.

A serial of simplified conceptions are incorporated into the summary of the invention, which will be further described in more detail in the detailed description. The summary of the invention neither implies that it is intended to limit the essential features and necessary technical features of the technical solution to be protected, nor implies that it is intended to define the protection scope of the technical solution to be protected.

Advantages and features of the present invention will be described in detail below in connection with the accompanying drawings.

BRIEF DESCRIPTION OF THE DRAWINGS

The following drawings of the present invention as a part of the present invention herein are used for understanding of the present invention, the embodiments and the descriptions thereof are illustrated in the drawings for explaining the principle of the present invention. In the drawings.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

Figure 1:
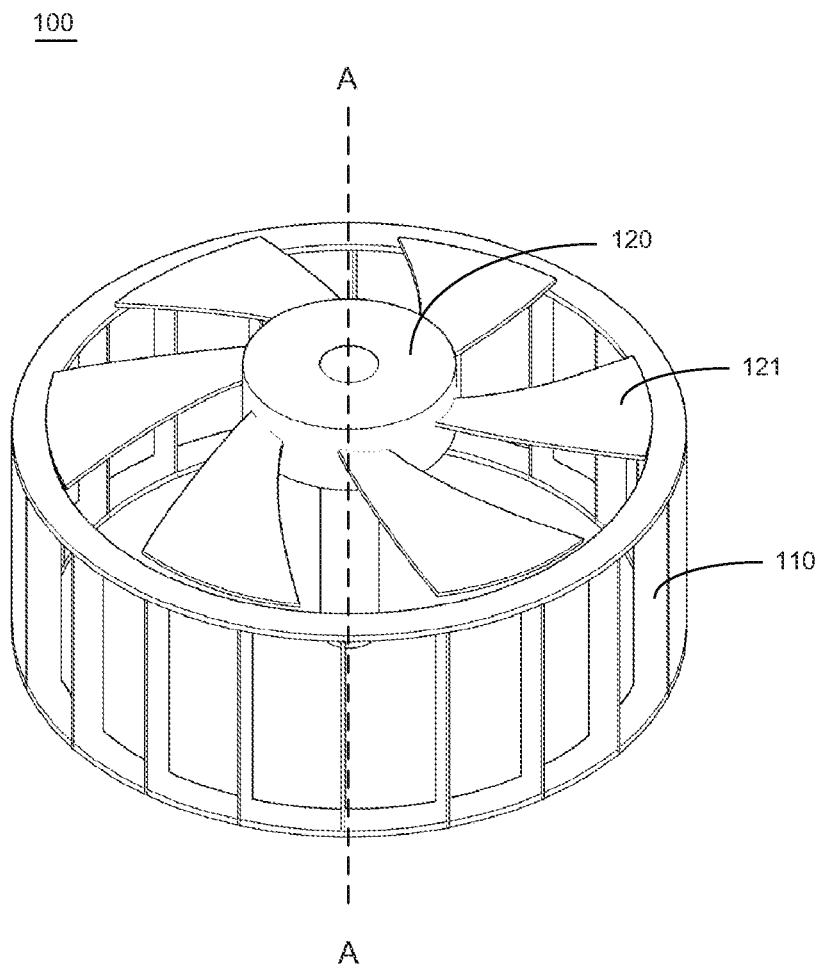
FIG. 1 is a schematic view of the turbofan according to one embodiment of the invention.
Figure 2:
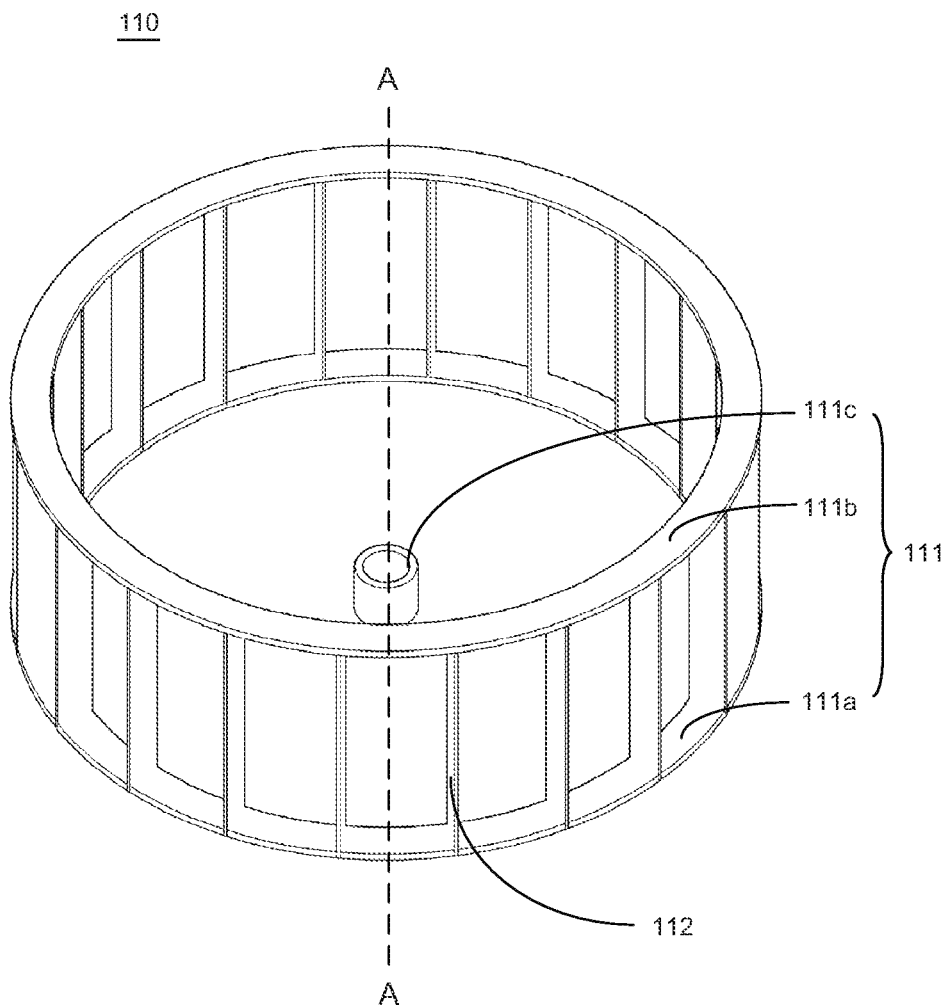
FIG. 2 is a schematic view of the turbofan assembly according to one embodiment of the invention.

According to one aspect of the invention, a turbofan is provided. In the case that the turbofan runs with a better cooling performance, the turbofan can produce a lower noise value. FIG. 1 illustrates the turbofan according to one embodiment of the invention. As shown in FIG. 1, the turbofan 100 comprises a turbofan assembly 110, an inlet fan assembly 120 and a driving means (not shown). FIG. 2 illustrates the turbofan assembly 110 according to one embodiment of the invention. The turbofan will be described in detail by combining with FIGS. 1-2 below.

The turbofan assembly 110 may include a main frame 111 and a plurality of vanes 112 disposed on the main frame 111. The transverse cross section of the main frame 111 may be in the shape of a circle or a ring. As an example, the main frame 111 may be in the shape of a disk with a predetermined thickness. The main frame 111 may include a hub 111c disposed at the centre thereof. The hub 111c is connected with a rotating axle of the driving means (such as a motor), and it is driven by the driving means to rotate. The hub 111c may be disposed in a conventional manner, which is no longer described in detail. However, it should be noted that factors, such as the position and the driving manner of the driving means and the airflow in the turbofan, etc., may be considered during designing the structure of the hub 111c. The plurality of vanes 112 are arranged at the outer circumference of the main frame 111 in an equal interval, and each of the vanes 112 should be disposed not perpendicular to the radial direction of the main frame 111. The vanes 112 are configured to rotate together with the rotating axle (not shown) of the driving means to produce a centrifugal force when receiving the rotating force from the driving means. In this way, the air may enter in the axial direction A-A of the turbofan assembly 110 and go out in the radial direction of the turbofan assembly 110, so as to enable the turbofan assembly to admit air in the axial direction A-A and dispense air in the radial direction. The angle between the vanes 112 and the radial direction of the main frame 111 as well as the shapes and the quantity of the vanes 112 may be selected according to the application of the turbofan 100 and the desired air output.

The inlet fan assembly 120 is disposed at an inlet of the turbofan assembly 110 and disposed coaxially with the turbofan assembly 110. The turbofan assembly 110 is disposed coaxially with the inlet fan assembly 120, and thus the axial direction A-A of the turbofan assembly 110 mentioned before is also the axial direction of the turbofan 100. They are not distinguished below. The turbofan assembly 110 takes in air at the inlet in the axial direction, which causes a negative pressure state is presented at the inlet. And, as the rotating speed of the turbofan assembly 110 is rising, the negative pressure state at the inlet becomes more obvious. Consequently, a part of the work done by the turbofan assembly 110 is used to gather the ambient air to the inlet. The inlet fan assembly 120 disposed at the inlet mainly acts to gather the ambient air to the inlet so as to change the negative pressure state at the inlet. In this way, the rotating speed of the turbofan assembly 110 may be reduced on the premise that the cooling performance is maintained. As the inlet fan assembly 120 is disposed at the inlet, the efficiency of the inlet fan assembly 120 for gathering the ambient air is relatively higher. Therefore, the turbofan 100 is able to achieve an excellent cooling effect and produce a lower noise with a lower rotating speed.

In addition, the driving means may drive the inlet fan assembly 120 and the turbofan assembly 110 to rotate synchronously as needed, and the inlet fan assembly 120 and the turbofan assembly 110 may also be respectively driven to rotate in different rotating speeds. Consequently, the driving manner of the turbofan 100 is more flexible.

According to one preferred embodiment of the invention, the main frame 111 may be configured to be an annular frame, as shown in FIG. 2. The annular frame may include a first annular component 111a located on the bottom of the turbofan assembly 110, a second annular component 111b located on the top of the turbofan assembly 110 and the hub 111c. As mentioned before, the hub 111c may be disposed in a conventional manner. The plurality of vanes 112 are disposed on the annular frame and extend along the axial direction A-A of the turbofan assembly 110. That is, the plurality of vanes 112 are located between the first annular component 111a and the second annular component 111b. The bottom ends of the vanes 112 are connected to the first annular component 111a and the top ends of vanes 112 are connected to the second annular component 111b, so as to form a space in the interior of the main frame 111. The end where the first annular component 111a is located may act as the installing end of the turbofan 100 for contacting with the component to be installed, and the end where the second annular component 111b is located is the inlet end of the turbofan assembly 110. Although the first annular component 111a is located at the installing end, the air may also enter from the installing end in the installed state to improve the cooling efficiency, if there is an interval between the component to be placed and the first annular component 111a. More preferably, when the space is formed in the turbofan assembly 110, the driving means and the inlet fan assembly 120 may also be disposed in the space to enable the structure of the turbofan 100 to be compact.

According to one embodiment of the invention, the vanes of the inlet fan assembly 120 extend along the radial direction of the turbofan 100. The vanes extend in the radial direction such that the inlet fan assembly 120 is basically in a state of admitting air in the axial direction and dispensing air in the radial direction. The turbofan assembly 110 needs to admit air in the axial direction, and thus the vanes of the inlet fan assembly 120 extending along the radial direction does not influence the airflow path of the turbofan assembly 110. Conversely, the inlet, fan assembly 120 would enhance the air flow in the turbofan assembly 110. Therefore, the turbofan 100 has a higher cooling efficiency.

The inlet fan assembly 120 may be coaxially connected to the turbofan assembly 110 (for example, connected to the main frame 111 of the turbofan assembly 110) through the hub thereof. The inlet fan assembly 120 may be fixedly connected to the turbofan assembly 110. In this way, the inlet fan assembly 120 and the turbofan assembly 110 may be driven to rotate synchronously by the driving means. The inlet fan assembly 120 may also be rotatably connected to the turbofan assembly 110 relative to the turbofan assembly 110 such that the turbofan assembly 110 and the inlet fan assembly 120 may have different rotating speeds. As an example, the turbofan assembly 110 may be connected with the inlet fan assembly 120 through a transmission, in this way, the inlet fan assembly 120 and the turbofan assembly 110 may have different rotating speeds by virtue of only one driving means. Of course, the turbofan assembly 110 and the inlet fan assembly 120 may also be controlled to rotate in different speeds by two driving means, respectively. The vanes of the inlet fan assembly 120 are not limited to the shapes and the quantity illustrated in the figures. The invention is not intended to limit it.

Preferably, as shown in FIGS. 1-2, in the case that the turbofan assembly 110 includes an annular support 111 and the vanes 112 extending in the axial direction on the annular support 111, the inlet fan assembly 120 may be disposed in the space formed by the turbofan assembly 110, and the inlet fan assembly 120 is located at one side of the annular support 111 in proximity to the inlet. That is, the inlet fan assembly 120 may be disposed on the top end of the annular support 111 and located in the second annular component 111b. In this way, on one hand, the structure of the turbofan 100 may be compact, and on the other hand, the space of the airflow in the turbofan assembly 110 cannot be influenced by the intervention of the inlet fan assembly 120. To improve the efficiency of the inlet fan assembly 120, preferably, the diameter of the inlet fan assembly 120 matches with the inner diameter of the annular support of the turbofan assembly 110. That is, in the case that the inlet fan assembly 120 is allowed to rotate in the annular support, the vanes of the inlet fan assembly 120 may be as long as possible to improve the air intake efficiency.

Figure 3:
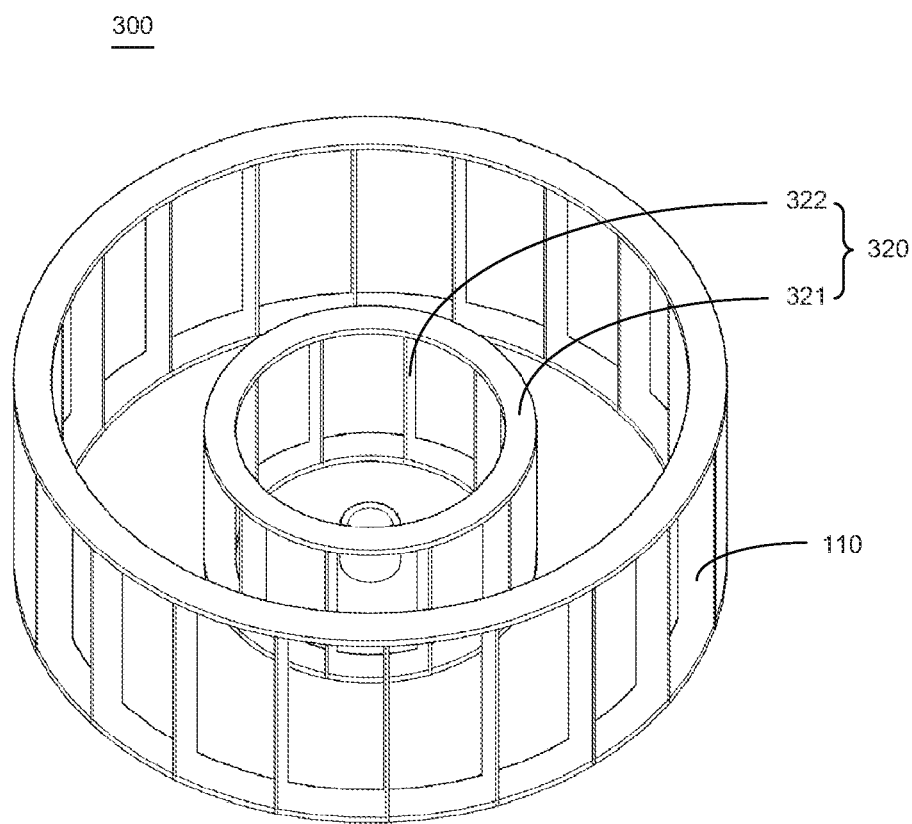
FIG. 3 is a schematic view of the turbofan according to another embodiment of the invention.

According to another embodiment of the invention, as shown in FIG. 3, the inlet fan assembly 320 has a similar structure to the turbofan assembly 110. That is, the inlet fan assembly 320 comprises a annular support 321 and vanes 322 disposed on the annular support 321, wherein the annular support 321 of the inlet fan assembly 320 is disposed coaxially with the annular support of the turbofan assembly 110, and at least a portion of the annular support 321 is contained in the space formed by the turbofan assembly 110, and the vanes 322 of the inlet fan assembly 320 also extend along the axial direction of the turbofan 300. The angles of the vanes 322 of the inlet fan assembly 320 and the angles of the vanes of the turbofan assembly 110 relative to the radial direction of the turbofan 300 may be the same or different.

At the inlet of the turbofan assembly 110, the area which is closer to the vanes of the turbofan assembly 110 has a stronger capacity for admitting air. The capacity that the central area of the turbofan assembly 110 admits the air may be improved through adding the inlet fan assembly 320 in the turbofan assembly 110. The air entering the inlet fan assembly 320 in the axial direction flows into the annular area between the inlet fan assembly 320 and the turbofan assembly 110 along the radial direction, and the airflow would be accelerated by the inlet fan assembly 320. Therefore, the inlet fan assembly 320 may not only increase the air intake efficiency of the turbofan 300, hut also pre-accelerate the airflow dispensed from the turbofan 300. Consequently, the turbofan has a higher cooling efficiency. In addition, the inlet fan assembly 320 changes the direction and speed of the airflow admitted and dispensed from the turbofan 300 and increases the pressure of the air admitted and dispensed, and thus the frictional noise between the airflow admitted and dispensed decreases.

As an example, the inlet fan assembly 320 may be fixedly connected to the turbofan assembly 110 such that they may be driven by the driving means to rotate synchronically. In addition, the inlet fan assembly 320 may also be rotatably connected to the turbofan assembly 110 relative to the turbofan assembly 110 such that the turbofan assembly 110 and the inlet fan assembly 320 have different rotating speeds. As an example, the turbofan assembly 110 may be connected with the inlet fan assembly 320 through a transmission. In this way, the inlet fan assembly 320 and the turbofan assembly 110 may have different rotating speeds by virtue of only one driving means. Of course, the turbofan assembly 110 and the inlet fan assembly 320 may also be controlled by two driving means to rotate in different speeds.

Preferably, one side of the annular support 321 of the inlet fan assembly 320 away from the inlet is connected to one side of the annular support of the turbofan assembly 110 away from the inlet. The inlet fan assembly 320 may be connected to the turbofan assembly 110 through connecting the annular part at the bottom of the annular support 321 to the first annular component 111a of the turbofan assembly 110, so as to simplify the structure of the turbofan 300. Preferably, the axial length of the annular support 321 of the inlet fan assembly 320 is less than or equal to the axial length of the annular support of the turbofan assembly 110, to ensure that the air admitted by the inlet fan assembly 320 may be completely used by the turbofan assembly 110. To improve the air intake efficiency of the turbofan 300, preferably, the diameter of the inlet fan assembly 320 may be ¼ to ¾ of the diameter of the turbofan assembly 110.

According to another aspect of the invention, a graphics card is also provided. The graphics card includes any turbofan as mentioned before. The turbofan may be disposed near the main heat-dissipating component in the graphics card (such as a GPU), as long as the air dispensed by the turbofan is able to go through the main heat-dissipating component. The structure of each component included in the turbofan may be referred to the corresponding description mentioned before, and thus it is no longer described in detail.

To concluded, the turbofan provided by the invention gathers the ambient air tri the inlet through the inlet fan assembly disposed at the inlet of the turbofan assembly, so as to change a negative pressure state at the inlet. Consequently, the cooling efficiency of the turbofan is improved effectively and the noise of the turbofan is reduced.

The present invention has been described by the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope thereof.

What is claimed is:
1. A turbofan, comprising:
a turbofan assembly which admits air in an axial direction and dispenses air in a radial direction;
an inlet fan assembly disposed at an inlet of the turbofan assembly and disposed coaxially with the turbofan assembly; and
a driving means for driving the turbofan assembly and the inlet fan assembly to rotate,
wherein the turbofan assembly comprises a first annular support and first vanes disposed on the first annular support, the first vanes extend along the axial direction of the turbofan, and the first annular support forms a space in the interior thereof, wherein vanes of the inlet fan assembly extend along the radial direction of the turbofan, wherein the inlet fan assembly is disposed in the space and located at one side of the first annular support in proximity to the inlet, wherein a diameter of the inlet fan assembly matches with an inner diameter of the first annular support.

2. The turbofan according to claim 1, wherein the driving means and the inlet fan assembly are disposed in the space.

3. The turbofan according to claim 1, wherein the inlet fan assembly comprises a second annular support and second vanes disposed on the second annular support, the second annular support is disposed coaxially with the first annular support and at least a portion of the second annular support is contained in the space, and the second vanes extend along the axial direction of the turbofan.

4. The turbofan according to claim 3, wherein an axial length of the second annular support is less than or equal to an axial length of the first annular support.

5. The turbofan according to claim 3, wherein a diameter of the inlet fan assembly is ¼ to ¾ of a diameter of the turbofan assembly.

6. A graphics card, with a turbofan provided thereon, wherein the turbofan comprises:

a turbofan assembly which admits air in an axial direction and dispenses air in a radial direction;

an inlet fan assembly disposed at an inlet of the turbofan assembly and disposed coaxially with the turbofan assembly; and a driving means for driving the turbofan assembly and the inlet fan assembly to rotate, wherein the turbofan assembly comprises a first annular support and first vanes disposed on the first annular support, the first vanes extend along the axial direction of the turbofan, and the first annular support forms a space in the interior thereof, wherein vanes of the inlet fan assembly extend along the radial direction of the turbofan, wherein the inlet fan assembly is disposed in the space and located at one side of the first annular support in proximity to the inlet, wherein a diameter of the inlet fan assembly matches with an inner diameter of the first annular support.

7. The graphics card according to claim 6, wherein the driving means and the inlet fan assembly are disposed in the space.

8. The graphics card according to claim 6, wherein the inlet fan assembly comprises a second annular support and second vanes disposed on the second annular support, the second annular support is disposed coaxially with the first annular support and at least a portion of the second annular support is contained in the space, and the second vanes extend along the axial direction of the turbofan.

9. The graphics card according to claim 8, wherein an axial length of the second annular support is less than or equal to an axial length of the first annular support.

10. The graphics card according to claim 8, wherein a diameter of the inlet fan assembly is ¼ to ¾ of a diameter of the turbofan assembly.

* * * * *